Oct. 7, 1952        P. P. M. DUBOSCLARD        2,612,934

FORMING ROLL MACHINE

Filed June 13, 1949                                        3 Sheets-Sheet 1

PAUL P. M. DUBOSCLARD,
INVENTOR.

BY

ATTORNEY.

Oct. 7, 1952 P. P. M. DUBOSCLARD 2,612,934
FORMING ROLL MACHINE
Filed June 13, 1949 3 Sheets-Sheet 2

PAUL P. M. DUBOSCLARD,
INVENTOR.

BY [signature]

ATTORNEY.

Oct. 7, 1952  P. P. M. DUBOSCLARD  2,612,934
FORMING ROLL MACHINE
Filed June 13, 1949  3 Sheets-Sheet 3
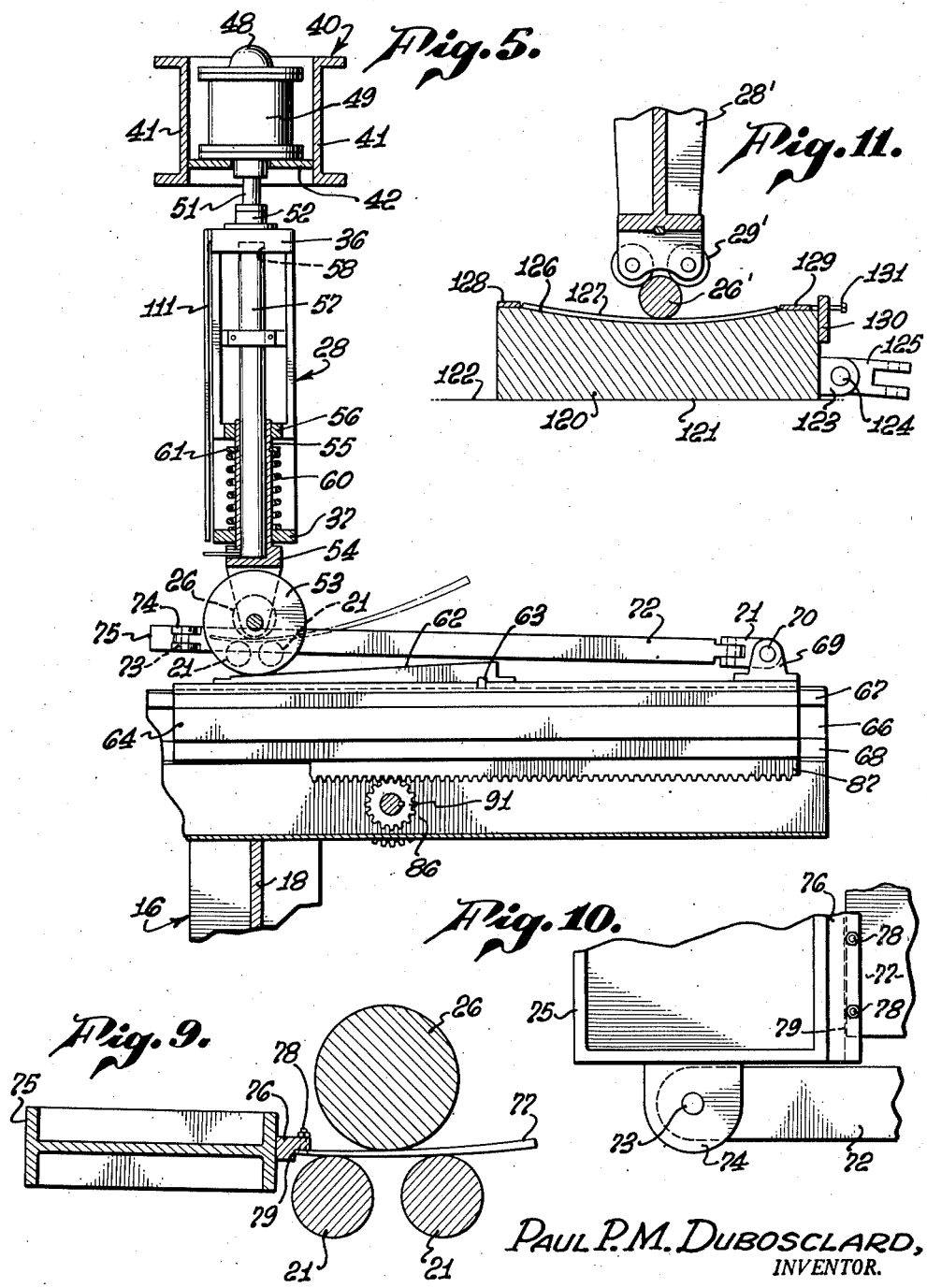
Paul P. M. Dubosclard,
INVENTOR.
BY
Attorney.

Patented Oct. 7, 1952

2,612,934

UNITED STATES PATENT OFFICE 2,612,934

FORMING ROLL MACHINE

Paul P. M. Dubosclard, Topanga, Calif.

Application June 13, 1949, Serial No. 98,831

15 Claims. (Cl. 153—32)

This invention relates to an improved forming roll machine especially adapted to form thick sheet metal stock of uniform or of non-uniform thickness into plates having surfaces that are capable of being generated by straight lines, such as conical surfaces.

Some prior machines for rolling sheet metal stock to form conical surfaces relate principally to stock of relatively thin metal sections. These prior machines are not suitable for the forming of true conical surfaces on sheet metal stock of heavy section or thickness.

Improvements and technical advances in structural design, especially in the airplane industry, require the provision of relatively heavy skin plates of non-uniform section for taking unusual loads imposed upon the skin plates. In this new structural design it may be desirable for the skin plates to have a tapering section both span-wise and chord-wise. It is also required that these thick skin plates must be very stiff and rigid in order to take loads imposed thereon and that all contours of the surfaces of the skin plates must be true and accurate in order to avoid the imposition of undesirable structural strains on other members of the structure. Since the thick skin plates are very stiff, it is extremely difficult and undesirable to pull the skins into proper assembled relationship with other members.

The forming roll machine of this invention is designed to form a sheet of metal of thick section, as for example one-eighth of an inch or more. Such a thick section sheet may be of uniform or of varying cross-section which has been produced beforehand by some other means and which is not appreciably varied by the forming roll machine of this invention. The machine of the present invention is designed to form a sheet of thick section to provide aerodynamically correct surfaces capable of use on modern supersonic airplanes.

The primary object of this invention is to design and provide an improved forming roll machine capable of handling sheet metal stock of relatively thick section of uniform or non-uniform thickness for shaping it into true and accurate conical shapes.

An object of this invention is to design an improved forming roll machine wherein relatively thick sheet metal stock is formed into a desired curved sectional shape.

Another object of this invention is to design an improved forming roll machine wherein sheet metal stock of non-uniform thickness which may taper in section both span-wise and chord-wise can be formed into curved surfaces.

A further object of this invention is to design a forming roll machine wherein waste of the sheet metal stock being formed is reduced to a minimum.

Still another object of this invention is to provide a novel method of accurately forming conical surfaces on a sheet of stock wherein the stock is positively propelled through a forming roller assembly, the progression of opposite ends of the stock being at different rates of speed so selected that the roller assembly will contact the stock along lines coinciding with the generatrix of the shape desired.

This invention contemplates an improved forming roll machine utilizing an assembly of rolls which are mounted to be freely rotatable and means for positively and independently driving the sheet metal stock being formed in contact with the roll assembly in such a manner that the line of contact of the rolls is along the generatrix of the shape desired.

Still another object of this invention is to provide a forming roll machine of the character described above with driving means capable of moving the stock through the roller assembly in either of two stock forming directions.

Another object of this invention is to provide an improved forming roll machine wherein opposite sides of the sheet metal stock being formed through the roller assembly are positively moved at selected predetermined different rates of speed for forming a true conical surface on said stock.

Other objects and advantages of this invention will be readily apparent from the following description of the drawings.

In the drawings:

Fig. 5 is a fragmentary enlarged sectional view taken in the plane indicated by the line V—V of Fig. 4.

Fig. 9 is an enlarged fragmentary sectional view illustrating the stock-connecting means.

Fig. 10 is a fragmentary plan view of the stock-connecting means shown in Fig. 9 illustrating a form of end connection of the stock-connecting means to the carriage.

Fig. 11 is a fragmentary sectional view illustrating a different modification of this invention which is adapted to process sheet metal stock into curved shapes.

Figure 1:
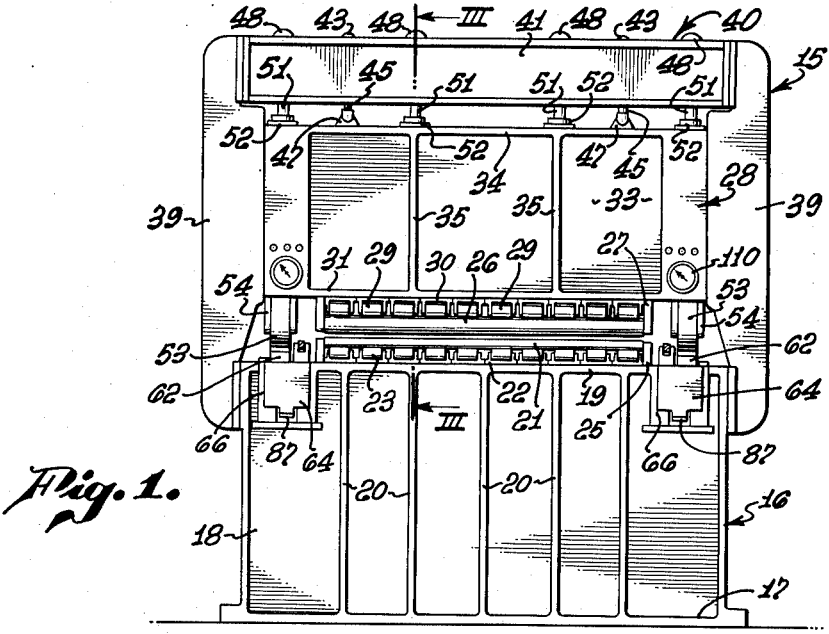
Fig. 1 is a front elevational view of a forming roll machine embodying this invention.

Referring particularly to the drawings the forming roll machine, illustrated therein as an embodiment of this invention, includes an idle roll assembly or system through which a sheet of stock being formed is moved by positive driving means particularly arranged for moving opposite sides of the stock at predetermined selected different rates of speed. As the stock is passed between the rolls of the idle roll assembly pressure is applied to one of the rolls of the assembly by hydraulic thrust means and the effects of the applied pressure to the roll are positively limited by stock contour cam means which are synchronized and operably associated with the driving means. The selected predetermined speed ratio of movement of the opposite sides of the sheet metal stock causes the rolls to contact the sheet metal stock along a line of contact which will produce a true and accurate conical surface on the sheet metal stock being formed.

The improved forming roll machine generally indicated at 15 comprises a bed 16 which may be suitably installed below floor level. The bed 16 includes a rigid, heavy, transverse member of suitable metal having a horizontally disposed base flange 17, a vertical web 18, a top horizontal roller supporting flange 19 and suitably spaced vertical reinforcing ribs 20.

Intermediate its ends top horizontal flange 19 supports a pair of horizontally disposed idle rolls 21 by means of a plurality of closely spaced aligned brackets 22, each bracket 22 rotatably supporting a pair of roller bearings 23 in contact with the associated roll 21. The brackets 22 are suitably secured as by keyways and cooperating keys to the top horizontal flange and afford through the roller bearings 23 a continuous support for the associated roll 21 throughout its entire length. The continuous support thus provided reduces to a minimum any bending of the supported roll 21 intermediate its ends which might produce an untrue conical surface having a "belly" intermediate its ends. Each pair of roller bearings 23 include bearings of different diameters designed for taking the different load factors transmitted through roll 21.

The pair of rolls 21 are of relatively small diameter and are supported in spaced relationship to each other, their axes lying in virtually the same horizontal plane. Each end of each roll 21 may be provided with a suitable axial shaft 24 journaled in a suitable bearing carried by an upstanding trunnion 25 provided on top flange 19. The pair of rolls 21 are free to rotate in either direction and are mounted as idle rolls.

In addition to the pair of rolls 21, the roller assembly includes a pressure transmitting roll 26 spaced slightly above and between the pair of spaced rolls 21. The pressure transmitting roll 26 may be of slightly larger diameter than roll 21 and is journaled at opposite ends in depending trunnion brackets 27 provided adjacent ends of a rigid vertically movable beam 28. The roller 26 is supported throughout its length against bending by a plurality of paired closely longitudinally spaced roller bearings 29 carried by brackets 30 secured in any suitable manner to a bottom horizontal flange 31 of rigid beam 28. The brackets 30 may be keyed as at 32 to the flange 31.

The rigid beam 28 includes a vertical web 33, a top horizontal flange 34, and vertical stiffening reinforcing spaced ribs 35 disposed on opposite sides of web 33 and extending between top and bottom flanges 31 and 34. At each end beam 28 may be provided with top and bottom horizontally disposed projections 36 and 37 respectively which are slidable within a vertically disposed guide groove 38 formed in the inner surface of an upright 39.

Each upright 39 is formed of a relatively heavy rigid metal structural shape and may be secured to the bed 16 in any suitable manner as by spaced bolt and nut assemblies (not shown). The uprights 39 are rigidly connected together at their tops by a rigid cross-head 40 extending therebetween. The cross-head 40 may comprise a pair of spaced vertically arranged channels 41 connected adjacent their lower edge by a horizontally disposed web 42 extending the length of the cross-head. The web 42 of the cross-head provides means for carrying hydraulic means generally indicated at 43, supporting the rigid beam 28 from the cross-head and a plurality of thrust or pressure applying hydraulic means 48.

The beam-supporting hydraulic means 43 may include a cylinder 44 having a piston operable within the cylinder, said piston having a piston rod 45 extending below cross-head 40 for pivotal connection at 46 to a beam-supporting bracket 47 secured to top flange 34 of beam 28. The beam-supporting hydraulic means 43 disposed above each half of beam 28 are operable from the same hydraulic pressure fluid system as described in detail hereinafter.

Figure 4:
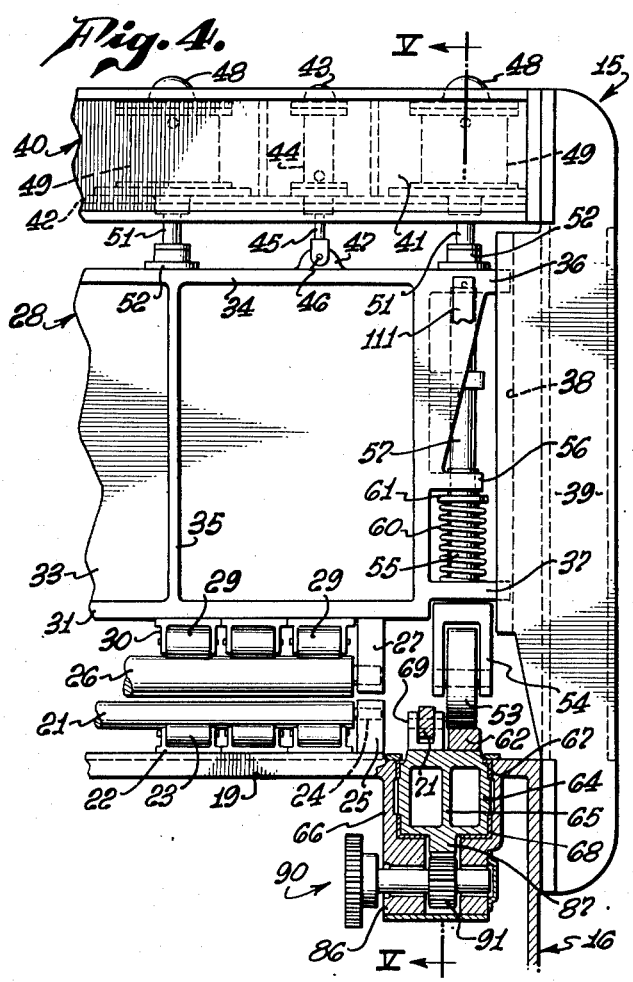
Fig. 4 is an enlarged fragmentary front view, partially in section, of Fig. 1, the section being taken rearwardly of the cross-head structure and substantially in a vertical plane indicated by line IV—IV of Fig. 2.
Figure 7:
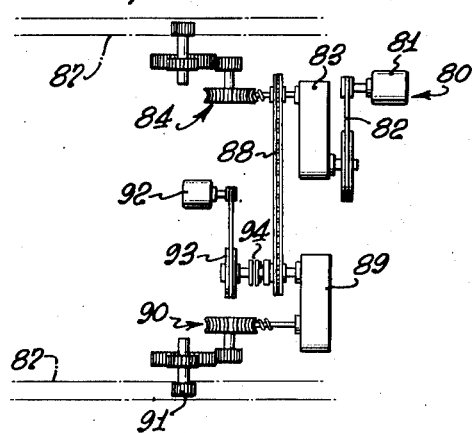
Fig. 7 is a diagrammatic plan view of driving means employed in this invention.
Figure 8:
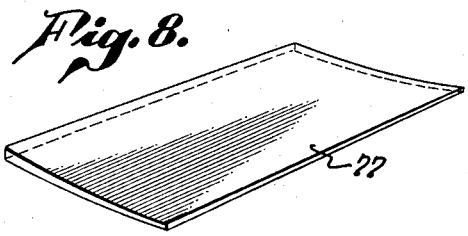
Fig. 8 is a perspective view of a curved sheet of stock having a non-uniform section both span-wise and chord-wise.

As best seen in Fig. 4, above each half of beam 28, the cross-head supports a plurality of thrust hydraulic means 48 illustrated here as a pair of thrust means 48. Each thrust hydraulic means 48 includes a cylinder 49 having a piston head 50 operable therein and a piston rod 51 extending downwardly below the cross-head 40 for a suitable connection as at 52 to the top flange 34 of the rigid beam 28. The thrust hydraulic means 48 are provided with sufficient capacity for transmitting desired pressures through the rigid beam 28 to the pressure-transmitting roller 26 for application to a sheet of stock metal being passed through roll assembly. The pair of thrust hydraulic means 48 above each half of beam 28 are actuated independently from the pair of hydraulic means 48 above the other half of the beam as will be described in detail hereinafter.

At each end of rigid beam 28 and disposed in alignment with the outer thrust hydraulic means 48 is provided a load-bearing wheel 53 journaled in a U-shaped wheel-supporting bracket 54, said bracket 54 being provided with an upstanding hollow tubular sleeve 55 which extends upwardly through aligned openings in the bottom projection 37 and an intermediate spaced projection 56. The sleeve 55 accommodates therewithin a load-bearing column or rod 57 having its upper end seated within a suitably aligned recess 58 formed within top projection 36. Thrust applied by the thrust hydraulic means 48 will thus be not only transmitted through the rigid beam 28 to the thrust transmitting roll 26 but the applied thrust will also be transmitted through the load-bearing rod 57, to the load-bearing wheel 53.

In order to relieve and reduce backlash stresses at opposite ends of the rigid beam 28 because of the arrangement of load-bearing wheel 53 with the beam 28, a coil spring 60 is sleeved over the sleeve 55 between the bottom projection 37 and a collar 61 provided on sleeve 55 below the intermediate projection 56. The spring 60 thus acts to relieve and absorb back-lash forces which may occur when the thrust of hydraulic means 48 is reduced.

As best shown in Figs. 4 and 5 the load-bearing wheel 53 at each side of the forming roll machine is provided with rolling contact on the upper surface of elongated cam means 62 secured in any suitable manner as by a key 63 to a longitudinally slidable carriage 64. The cam means 62 extends longitudinally of the carriage adjacent the outer edge of the carriage and provides a preselected cam surface of desired curvature for forming the sheet metal stock into the desired curved shape.

Each carriage 64 may be of generally box shape cross-section having a central longitudinally extending vertical reinforcing web 65. The carriage 64 may be of any suitable length preferably slightly greater than one-half the length of an accommodating way 66 which extends normal to and on opposite sides of the axis of the roller assembly.

Each way 66 is provided with a plurality of longitudinally extending top corner bushings 67 and bottom corner bushings 68, said bushings being of angle cross-section, for providing virtually frictionless surfaces upon which the carriage 64 may be easily slidable. The way 66 is supported at its center from the bed 16 and may be supported throughout its length toward its ends by any suitable foundation means (not shown).

At one end of each carriage 64 a bracket 69 is provided spaced inwardly from the longitudinal axis of the carriage. The bracket 69 provides a pivotal connection at 70 to a clevis 71 having a pivotal connection to a stock-connecting rod 72 which extends for approximately the entire length of the carriage 64. At its other end each stock-connecting rod 72 is afforded a pin connection at 73 to vertically spaced lugs 74 projecting outwardly from each end of a stock follower member 75. The stock follower member 75 may comprise a transversely extending beam of any suitable structural shape having secured thereto along one side a longitudinally extending stock-securing member 76 of generally L section. As seen in Fig. 9 a substantially flat sheet of stock 77 may be connected to the stock-securing member 76 in any suitable manner as by spaced nut and bolt assemblies 78 extending through the end margins of one end of the sheet of stock 77 and the horizontally disposed leg of the L-shaped stock-securing member 76. The edge of the stock sheet 77 may abut the vertically disposed leg as at 79.

The stock-connecting rods 72 being spaced inboardly of the cam means 62 and the load-bearing wheel 53 permit the stock connecting rods 72 to be reciprocally movable past the roller assembly. Since the stock-connecting rods 72 and the stock follower 75 afford a substantially rigid follower structure it will be readily apparent that a sheet of stock may be either pushed or pulled through the roll assembly.

Figure 2:
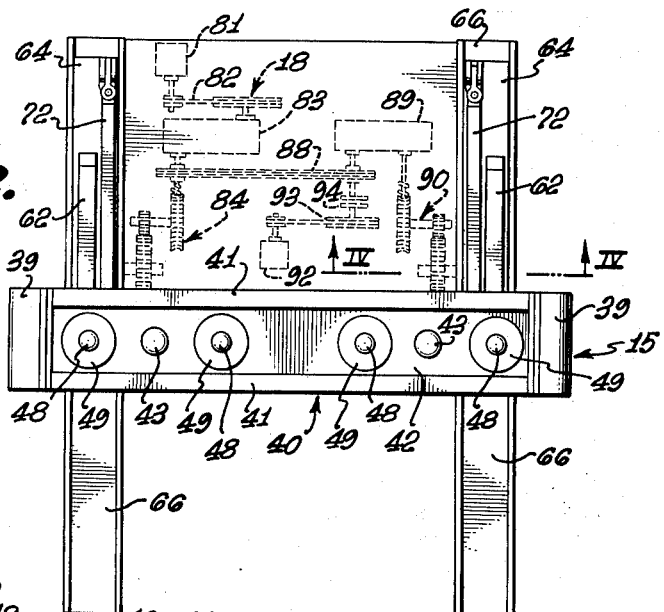
Fig. 2 is a top plan view of Fig. 1.

Means for propelling the sheet of stock 77 through the roller assembly by driving each carriage 64 at predetermined, selected independent speeds is provided by a driving means generally indicated at 80. The driving means 80 comprises an electric motor 81 having its output shaft suitably connected to a drive belt 82 for driving a variable speed ratio device 83. The exemplary device 83 may be a variable speed drive comprising a system of gears and a positive chain to transmit power. Such a variable speed drive mechanism is commonly known as a P. I. V. For brevity, such variable speed drive means will be referred to as a P. I. V., although it will be understood that other suitable variable speed drive means may be used. The P. I. V. 83 is connected through a suitably arranged gear train generally indicated at 84 to a pinion gear 85 suitably journaled in a bracket 86 formed in the bottom of the associated way 66 at one side of the transverse axis of the forming roll machine. The pinion gear 85 meshes with a depending rack bar 87 formed centrally along the bottom wall of the carriage 64 and extending for substantially the entire length of the carriage. It will be noted that P. I. V. 83 will thus drive through the gear train 84 the carriage 64 located at the left side of the forming roll machine as viewed in Fig. 2.

The P. I. V. 83 is provided with a driving connection by means of a belt and pulley system 88 to the input side of a second variable speed device 89 or P. I. V. The output side of P. I. V. 89 is connected through a suitable gear train generally indicated at 90 to a pinion gear 91 which is provided meshed engagement with the depending rack bar 87 formed on the carriage 64 located at the right side of the forming roll machine. In operation, the speed of the left hand carriage (as viewed in Fig. 2) is equal to a constant multiplied by the ratio of P. I. V. 83, while the speed of the right hand carriage is equal to a constant multiplied by the ratio of P. I. V. 83 and also by the ratio of P. I. V. 89. Thus the speed ratio of one carriage to the other carriage is equivalent to the ratio of P. I. V. 89. The function of P. I. V. 83 is to govern the overall speed of the processing operation without affecting the relative speeds of the carriages.

To facilitate placing of a sheet of stock in its proper position for the rolling operation, an auxiliary motor generally indicated at 92 is suitably connected by belt and pulley drive means 93 to a double acting clutch 94. The double acting clutch 94 is operably connected to the second P. I. V. in such a manner that drive 88 may be disconnected from the input side of the P. I. V. 89 and the auxiliary motor may be used to individually drive the right hand carriage 64. Thus the two carriages at opposite sides of the forming roll machine may be adjustably positioned as desired to facilitate the connection of the stock with the stock follower and to position the stock as desired between the rolls of the roller assembly.

Figure 6:
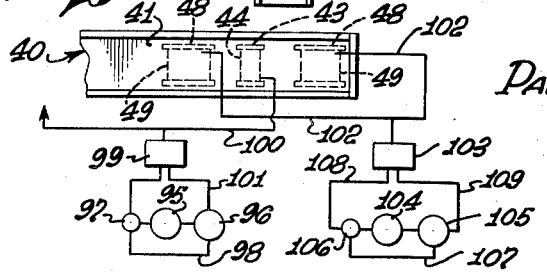
Fig. 6 is a diagrammatic view of a hydraulic system employed in the machine shown in Fig. 1.
Figure 3:
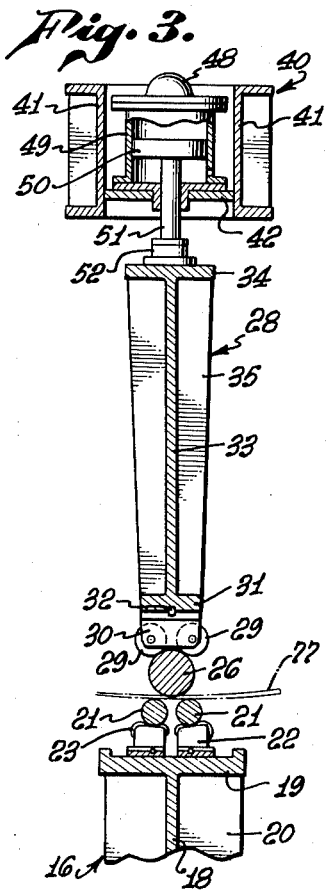
Fig. 3 is a fragmentary enlarged sectional view taken in the vertical plane indicated by the line III—III of Fig. 1.

The hydraulic means 43 mounted on the crosshead 40 which provides a hydraulic support for the rigid beam 28 are operable by means of a pumping unit 95 diagrammatically indicated at Fig. 6. The pumping unit 95 is fed from a fluid supply source or tank 96. The pumping unit is provided with a pressure relief valve means 97 which may be connected to a by-pass line 98 to the tank. The pumping unit 95 is connected through the pressure relief valve 97 to a simple control valve means 99 which is operably connected by lines 100 to each weight-supporting hydraulic means 43. In the arrangement shown in Fig. 6 the fluid pressure of the two spaced hydraulic means 43 will be substantially equalized so that the rigid beam will be supported in the proper desired horizontal position from the cross-head. When it is desired to reduce or control the pressure of the fluid acting in the cylinders of hydraulic means 43, the control means 99 may be so actuated as to cause flow of the pressure fluid through return line 101 connected to the supply tank 96.

Each pair of thrust hydraulic means 48 on opposite sides of the longitudinal axis of the forming roll machine are actuated by a separate independent pressure fluid system as indicated in Fig. 6. The fluid system illustrated therein includes input lines 102 connected to the top portion of each cylinder 49 of a pair of hydraulic means 43. The input lines 102 are joined by a suitable T connection to the output side of a control means or valve 103. The control means 103 is suitably connected to a pumping unit 104 and a supply tank 105. The pumping unit 104 is provided with a pressure relief valve means 106 suitably connected by line 107 to the supply tank 105 for bypassing pumped fluid when the desired fluid pressure is reached in the hydraulic means 43. The pumping unit 104 is connected by line 108 to the control means 103 and a return line 109 is afforded between the supply tank 105 and the control means 103. The operation of control means 103 for regulating fluid pressure in the cylinders 49 of the hydraulic means 48 may be selectively increased or decreased so that the piston 50 is actuated downwardly for transmitting a desired thrust pressure against the rigid beam 28 for transmission to the pressure-applying roll 26. Since the pairs of hydraulic means 48 at each side of the cross-head are actuated from independent pumping units, the thrust transmitted at opposite ends of the rigid beam 26 may be varied to make the thrust at each end proportionate to the resisting moment of the stock being rolled. The rigid beam 28 is permitted a slight angular displacement about its horizontal axis within the guide grooves 38 provided in the uprights to permit the beam and its cam following rollers 53 to follow cams of different contours at end thereof.

In order to accurately control the pressures transmitted to the sheet of stock through the pressure-applying roll 26, strain gauge means are provided at opposite sides of the rigid beam 26. The strain gauge means includes the load-bearing or compression bar 57 and load-free bar 111 of approximately the same length as the compression bar 57 mounted adjacent bar 57 for comparison therewith. The difference between the lengths of the load-free bar and the compression bar is indicated upon a strain gauge indicator 110 in usual manner, deflection of the strain gauge needle indicating the thrust forces being applied to the sheet of stock. The strain gauge means may also be used to actuate electrical means for illuminating a series of warning and danger lights in order to visually alert the operator that the pressures being applied to the sheet of stock exceed desired pressures. The strain gauge means may also be suitably connected by electrical means to safety switches which may automatically act to vary pressures in the thrust hydraulic means 48 by regulating the control valve means 103.

In operation it is contemplated that the desired configuration of cam surfaces on each cam means 62 has been accurately determined and the cam means have been secured in their proper positions on the carriages 64. The rigid beam 28, which is supported by the weight-supporting hydraulic means 43 is suitably positioned so that a sheet of stock of desired thickness may be inserted in the roll assembly between the pair of bottom rolls 21 and the upper pressure-applying roll 26. After the sheet of stock is properly aligned between the rolls, pressure is applied through the thrust hydraulic means 48 until the loading on the cams, as evidenced by the strain gauges, reaches a pre-determined amount. The stock-connecting rods may then be connected to the stock follower member 75 to which the sheet of stock has previously been secured. The P. I. V. 89 is then set to the preselected speed ratio as determined by the particular conical surface which it is desired to form, and the drive means 80 may then be started. As the drive means through the pinion gears 85 and rack bars 87 slidably move the carriages along the ways in the desired direction, the cam pressure changes as soon as the movement of the stock begins. If the cam pressure as measured by the strain gauges materially increases, the operator may manually actuate the fluid control valves regulating the supply of fluid to the thrust cylinders in order to control the downward thrust. Likewise, if the cam pressure decreases, the control valve may be manipulated to increase the downward thrust until the desired pressure is applied to the sheet of stock. Control of the cam pressure is important and desirable in order to avoid excessive pressures which might cause "over-rolling" of the stock or "brinelling" of the cams.

It will be readily apparent that as the carriages are slidably moved along the ways at different rates of speed as determined by the setting of the variable speed ratio devices 83 and 89, the sheet of stock is positively propelled through the roller assembly, one side of the stock moving at a different speed than the other side of the stock. The pre-determined speed ratios are such that as the sheet of stock progresses through the roller assembly, the rolls 26 and 21 contact the surfaces of the sheet of stock along lines which coincide with the generatrix of the conical surface desired to be formed. It should be particularly noted that the rolls 26 and 21 of the roller assembly are freely rotatable and act as idle rollers and that in the differential movement of the sheet of stock in the roller assembly, the rolls are free to slip on the surface of the stock. This slippage, however, does not interfere with the lines of contact of the rolls along the generatrix of the conical section being formed because of the positive propulsion of the stock and the direct connection between each carriage and the stock. Such slippage does not affect the result of the rolling operation because the slippage is not a functioning part of the stock riving means.

It will thus be apparent that a true and accurate formation of any surface that can be generated by a straight line can be produced on a sheet of stock by this improved forming roll machine by proper selection of the cam surfaces, control of pressure applied to opposite sides of the pressure-applying roll 26, and principally by the proper setting of the variable speed ratio devices which positively drive opposite sides of the sheet of stock through the roller assembly at the desired pre-selected differential rates of speed.

It may be noted that each spring 60 also acts to maintain each load-bearing wheel 53 normally out of contact with cam means 62 when the thrust means 48 are in released position, that is when no thrust is being applied to beam 28.

A different modification of an improved forming roll machine contemplated by this invention is illustrated in Fig. 11. The fragmentary part of the forming roll machine shown therein substitutes for the pair of rolls 21 of the roller assembly, and the cam means 62 of the previous modification, a cam block 120 extending between the carriages 64 on opposite sides of the machine and mounted thereon in any suitable manner. The cam block 120 may be made of a relatively heavy rigid thick section block of metal provided with a substantially smooth bottom surface 121 adapted to slide on a complementary smooth surface 122 extending between ways 66 and for substantially the entire length of the ways on opposite sides of the rigid beam 28'. The cam block 120 is provided at each end with a carriage connecting bracket 123 affording a pivotal connection at 124 to a suitable clevis 125 providing a convenient connection to the stock-connecting bracket 69 at one end of carriage 64.

The top surface 126 of the cam block 120 may be suitably formed and shaped to the selected conical surface which it is desired to produce on the bottom surface of a sheet of stock 127. The stock 127 is secured in position on the cam surface 126 by means of transversely extending stops 128 and 129. The stop 128 may be fixedly attached to the adjacent edge margins of the cam block 120. The stop 129 may be laterally adjustable in order to limit movement of the sheet of stock 127 on the cam surface 126. This adjustment may be made by any suitable means such as a plurality of spaced upstanding brackets 130 secured to the vertical face of cam block 120, said brackets being provided with a threaded bore providing threaded engagement with adjusting bolt 131, the end of said bolt being adapted to abut the edge of stop 129.

The rigid beam 28' is substantially identical to the beam 28 illustrated in the previous modification and supports a pressure-applying roll 26' in the same manner as the previous modification, said roll being supported along its length by a series of pairs of spaced bearings 29'.

Operation of the forming roll machine illustrated in Fig. 11 includes the transmission of thrust from the hydraulic thrust means carried on the cross-head through rigid beam 28' to the pressure-applying roll 26' in the same manner as in the previous modification. The sheet of stock may be positioned on the cam block 120 and the adjustable stop 129 adjusted to limit slippage of the stock 127 on the surface 126. Actuation of the drive means moves the carriages at opposite sides of the machine at different preselected speed ratios as described in the previous modification. The cam block 120 is propelled beneath the pressure-applying roll 26' in such a manner that the sheet of stock 127 is progressively moved in contact with the pressure-applying roll along the line of a generatrix of a selected surface which it is desired to form.

By predetermined selection of the form of cam surface to be provided on the cam block 120, the selected speed ratios for moving each end of the cam block independently and at a different speed than the other end of the cam block, and the application of varying pressures by means of an independently actuated pair of hydraulic means carried above each half of the rigid beam 28', a forming roll machine is provided wherein a sheet of stock of relatively thick section may be formed with true and accurate conical surfaces.

It will be readily understood by those skilled in the art that this improved forming roll machine is particularly adaptable to forming sheet metal stock or plates of relatively heavy metal section into plates which may be tapered spanwise and chord-wise into curved shapes presenting true and accurate desired conical surfaces.

All changes and modifications of this invention coming within the scope of the appended claims are embraced thereby.

I claim:

1. In a forming roll machine: a bed; a pair of stock-forming idle rolls rotatably mounted on said bed; a cross-head supported from said bed above said pair of rolls; a rigid beam supported from said cross-head; a stock-forming pressure idle roll carried by said beam above and between said pair of rolls for cooperation therewith; means for applying pressure to the roll carried by said beam; a carriage slidable at each side of the bed for reciprocal movement in directions normal to the axis of said rolls, said carriages having cam means in cooperative engagement with said beam for positively limiting effects of pressure applied to said beam; means for removably connecting a sheet of stock to said carriages; and means for differentially driving said carriages for moving opposite ends of the sheet of stock at different rates of speed while passing between said pressure roll and said pair of rolls.

2. In a forming roll machine adapted to roll conical surfaces on sheet metal stock of heavy section, the combination of: stock contacting roller means mounted to be freely rotatable; pressure means operably associated with the roller means for exerting pressure through said roller means upon a sheet of stock; stock contour controlling means having a selected surface for shaping the sheet of stock when acted upon by the roller means when under pressure; and means for passing the stock and stock contour controlling means from one side of the roller means to the other side thereof while under pressure from said roller means by moving one side of the stock and the contour means at a preselected different rate of speed than the opposite side thereof whereby the line of contact of the roller means with the stock will be along the generatrix of the conical shape being formed.

3. In a forming roll machine for rolling sheet stock of non-uniform section: spaced apart stock contacting idle rolls having their axis lying in virtually parallel relationship; pressure means for varying the relative position of said rolls; means for positively limiting the variation of relative position of the rolls by the pressure means; and means for positively driving a sheet of stock between said rolls while under pressure whereby said rolls contact said stock along lines of a generatrix of a conical surface, said stock driving means including means at opposite ends of a sheet of stock and operably connected thereto whereby one end may be driven faster than the other end.

4. In a forming roll machine: spaced apart stock contacting idle rolls having their axes lying in virtually parallel relationship; pressure means for varying the relative position of said rolls; means for limiting the variation of relative position of the rolls by the pressure means; means movable along opposite sides of the machine and adapted to be connected to a sheet of stock; and means for differentially driving said movable means for passing said stock between said rolls while under pressure.

5. In a forming roll machine for rolling sheet stock of non-uniform section; spaced apart stock contacting idle rolls having their axis lying in virtually parallel relationship; pressure means for varying the relative position of one of said rolls; means for limiting the position change of the one said roll by said pressure means; and means for positively driving a sheet of stock between said rolls while under pressure whereby said rolls contact said stock along lines of a generatrix of a conical surface, said driving means including means movable in parallel relation and at different rates of speed at opposite sides of the machine, said movable means being adapted to be attached to ends of said sheet of stock.

6. In a forming roll machine: spaced apart stock contacting idle rolls having their axis lying in virtually parallel relationship; pressure means for varying the relative position of said rolls; means for limiting the variation of relative position of the rolls by the pressure means; and means for positively driving a sheet of stock between said rolls while under pressure, said driving means including means adapted to be connected to opposite ends of said stock and selectively movable in parallel relation for moving each end of said stock at different predetermined rates of speed.

7. In a forming roll machine for rolling stock of non-uniform section, the combination of: a stock contacting roll assembly including a pair of freely rotatable rolls and a freely rotatable pressure roll cooperable with said pair of rolls; means for applying pressure to said pressure rolls; and selectively movable means for propelling stock through said roll assembly while under pressure, said movable means including connecting means adapted to be attached to a sheet of stock for positively moving opposite ends of the stock at preselected speeds.

8. A forming roll machine as stated in claim 7 wherein the stock propelling means includes at least two spaced carriages movable in parallel relation longitudinally of the machine and connected to the stock.

9. A forming roll machine as stated in claim 7 wherein the stock propelling means includes at least two spaced carriages connected to the stock, each carriage being positively driven at a preselected different speed.

10. A forming roll machine as stated in claim 7 wherein the stock propelling means includes at least two spaced carriages movable in parallel relation longitudinally of the machine and connected to the stock, each carriage being positively driven at a preselected different speed and cam means carried by each carriage and cooperably associated with the pressure applying means to limit the effects of the pressure applying means.

11. In a forming roll machine for rolling stock of non-uniform thick section, the combination of: a stock contacting roll assembly including a pair of freely rotatable rolls and a freely rotatable pressure roll cooperable with said pair of rolls; means for applying pressure to said pressure roll; means for propelling the stock through the roll assembly including carriages removably connected to the stock, each being positively driven at preselected correlated different rates of speed; and cam means including a stock contour member carried by each carriage for movement therewith and a cam follower means cooperable with said stock contour member and said pressure applying means for limiting effects of the pressure applied to said pressure roll.

12. In a forming roll machine for forming metal plates of thick section, the combination of: an idle roll assembly comprising a pair of spaced parallel lower idle rolls of uniform diameter and a vertically movable idle pressure roll of uniform diameter above and between said pair of rolls; pressure applying means associated with said pressure roll; carriage means including a carriage at each end of the roll assembly movable perpendicularly to the axis of said roll assembly; stock contour means carried by and movable with each carriage; cam follower means cooperably engaged with said stock contour means and associated with said pressure roll; means on said carriage means adapted to be connected to a sheet of stock; and means for driving each carriage at a preselected different rate of speed so that said stock is passed between said pressure roll and said pair of rolls with one end of said stock moving at a different rate of speed than the other end.

13. In a forming roll machine for forming metal plates of thick section, the combination of: an idle roll assembly comprising a pair of spaced parallel lower idle rolls and a vertically movable idle pressure roll above and between said pair of rolls; pressure applying means associated with said pressure roll; carriage means including a carriage movable adjacent to each end of the roll assembly; stock contour means movable with each carriage; cam follower means cooperably engaged with said stock contour means and associated with said pressure roll; means on said carriage means adapted to be connected to a sheet of stock; and means for driving each carriage at a preselected different rate of speed so that said stock is passed between said pressure roll and said pair of rolls with one end of said stock moving at a different rate of speed than the other end.

14. A forming roll machine as claimed in claim 13 wherein the drive means includes a variable speed ratio means operably connected to each carriage.

15. In a forming roll machine, the combination of: an idle roll assembly including a pressure roll; pressure applying means connected to said pressure roll; a pair of carriages reciprocally movable in parallel paths perpendicular to the axis of the roll assembly and passing in proximity to opposite ends of the assembly; stock contour means associated with each carriage; means cooperable with said contour means and with said pressure roll to limit pressure applied thereto; means for connecting each carriage to a sheet of stock to be formed; and means for moving each carriage at a selected predetermined rate of speed.

PAUL P. M. DUBOSCLARD.

REFERENCES CITED

The following references are of record in the file of this patent:

UNITED STATES PATENTS

| Number | Name | Date |
| --- | --- | --- |
| 270,077 | Jones | Jan. 3, 1883 |
| 1,828,489 | Carns | Oct. 20, 1931 |
| 1,840,059 | Smith | Jan. 5, 1932 |
| 2,251,901 | Carns | Aug. 5, 1941 |
| 2,325,523 | Lermont et al. | July 27, 1943 |
| 2,410,603 | Dubosclard | Nov. 5, 1946 |

FOREIGN PATENTS

| Number | Country | Date |
| --- | --- | --- |
| 257,726 | Germany | Mar. 17, 1913 |
| 314,807 | Germany | Oct. 14, 1919 |
| 83,536 | Switzerland | Dec. 16, 1919 |
| 534,391 | Germany | Sept. 25, 1931 |